Oct. 13, 1953　　　C. D. WILLIAMS　　　2,655,408
NOZZLE
Filed May 6, 1950
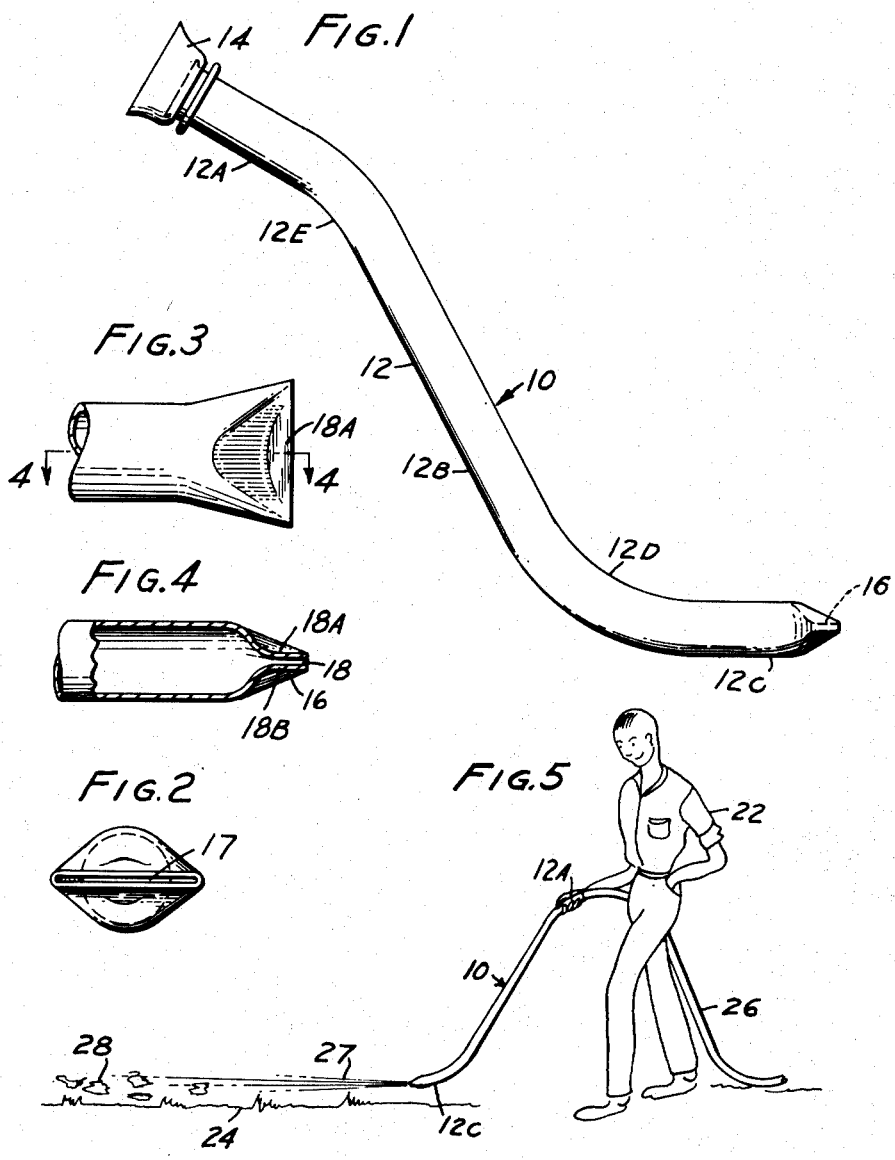
INVENTOR.
CHARLIE D. WILLIAMS,
BY
ATTORNEY.

Patented Oct. 13, 1953

2,655,408

UNITED STATES PATENT OFFICE 2,655,408

NOZZLE

Charlie D. Williams, Pasadena, Calif.

Application May 6, 1950, Serial No. 160,481

3 Claims. (Cl. 299—154)

This invention relates to a nozzle and more particularly to a specially designed nozzle to be used in conjunction with a source of fluid, say water, under pressure to clean debris from lawns, sidewalks, tennis courts, or the like.

Present practice in removing leaves, for example, from a lawn involves either the tedious procedure of raking the lawn or spraying the lawn with a high velocity jet of water from a conventional handgrip short nozzle. With a conventional nozzle the water jet strikes the lawn on an angle varying between about 10° and about 45° depending upon the assumed posture of the user. To do a thorough job by this method it is necessary to stoop so as to hold the nozzle as closely as possible to the ground, reducing the angle of incidence of the water to a minimum. Moreover, conventional nozzles are not made with this use in mind and generally discharge either an ineffective conical spray or a fine jet which spreads only slightly until after the water loses its effective velocity. I have now developed a nozzle specifically for this use, which is more rapid in "sweeping" a given area, more efficient, and a great deal more convenient to use.

A nozzle in accordance with the invention comprises an elongated tubular member, means at one end of the member for attachment to a source of fluid under pressure, say to the end of a garden hose, a constriction in the opposite end of the member forming an elongated narrow opening and a bend in the member adjacent the constricted end. According to the preferred practice the tubular member is also bent adjacent its opposite end and in the opposite direction, the bends being preferably in the form of smooth curves so as to offer no obstruction to the passage of fluid through the member. In the preferred embodiment the reverse bends in the member are such that when the nozzle is grasped adjacent the attaching end and held in a convenient position, the outlet or restricted end lies substantially parallel to the ground or surface to be cleaned.

Another feature is of great importance as effecting the efficiency of the nozzle. Thus if the discharge end of the nozzle is tapered abruptly to form the narrow opening, the water stream issuing therefrom will be divergent and will hence be comparatively ineffective in performing the designed purpose. On the other hand, I have found that if the opening is preceded by a restricted section of the tubing of comparatively small dimensions, a flat, high velocity jet is obtained. For best results the restricted section is formed by flattening the tube parallel to the major axis of the opening and so that the flat sides are spaced a distance approximately equaling the minor axis of the opening.

The invention will be more clearly understood by reference to the following detailed description taken in conjunction with the accompanying drawing in which:

Fig. 1 is a side elevation of preferred embodiment of the invention;

Fig. 2 is an end view of the discharge end of the nozzle of Fig. 1;

Fig. 3 is a plan view of the discharge end of the nozzle of Fig. 1;

Fig. 4 is a sectional elevation taken on the line 4—4 of Fig. 3; and

Fig. 5 shows the manner of using the nozzle for the purpose for which it is designed.

Referring to Figs. 1 to 4 of the drawing, there is shown a nozzle 10 comprising an elongated tube 12 divided into three straight sections, 12A, 12B, 12C separated by curved sections 12D, 12E with the curved sections 12D and 12E being oppositely directed. A conventional coupling 14 is rotatably affixed to one end of the nozzle at the open end of nozzle section 12A and provides for attachment of the nozzle to a hose or the like. The coupling 14 may take any form and may be of any size to adapt it to couple the nozzle to any source of fluid under pressure.

The discharge end 12C of the nozzle terminates in a restricted section 16 having an elongated narrow opening 17 through which fluid passing through the nozzle is discharged.

As mentioned above, an abrupt convergence of the side walls of the nozzle to form the opening 17 is not satisfactory since the resultant spray issuing from the opening 17 would be divergent to the point where its efficiency for the desired purpose is low. Hence the preferred construction as illustrated is realized by crimping the walls of the tube adjacent the opening 17 so as to provide a passageway 18 leading up to the opening. The passageway is preferably defined by parallel upper and lower wall sections 18A, 18B as shown in Fig. 4 and side wall sections flaring outwardly from the tube diameter to the major dimension of the opening 17. The passageway 18 is conveniently formed by crimping the tube wall to form upper and lower flats 18A, 18B in the shape of a circular segment so that the passageway 18 is of greater longitudinal depth adjacent the center of the tube than at the outer extremities of the tube. In addition to channeling water passing through the tube so that it will issue from the opening 17 as a flat, high velocity stream, the passageway 18, as formed in the manner shown, has the further advantageous function of distributing the water head substantially equally across the opening 17 so that a uniform high velocity stream of water issues from the entire opening 17. This is so since the passageway adjacent the center of the tube is deeper in the direction of water travel than it is adjacent the outer ends of the discharge opening, and more back pressure is thus developed at the point where the greatest flow is normally encountered.

For greatest convenience, the major axis of the opening 17 is transverse to the plane defined by the longitudinal axis of the curved tube section 12D as shown in the drawing. Furthermore, for greatest convenience in use, the longitudinal axes of the curved sections 12D and 12E lie in the same plane although this latter limitation does not affect the operation of the device.

For maximum efficiency I have found that the minor axis of the discharge opening should be from about 0.15 to .035 inch with the middle portion of this range, say from .020 to .030 inch being even more effective than the extremities of the range. This limitation on the length of the minor axis of the opening is not a necessary limitation but does define the optimum limits, particularly when the nozzle is to be used with a conventional garden hose.

The manner of using the nozzle 10 is shown in the drawing of Fig. 5 wherein a man 22 is shown as grasping the inlet end 12A of the nozzle in such fashion that the outlet end 12C is disposed close to the surface of a lawn 24 and is directed substantially parallel thereto. The nozzle is connected at its inlet end 12A to a conventional garden hose 26 which delivers water under pressure to the nozzle, the water issuing therefrom in a flat, high velocity stream 27 to carry leaves 28 and other debris off of the lawn.

Many modifications may be made in the apparatus as described and illustrated without materially affecting its operation and its convenience, provided only that the nozzle be sufficiently elongated and appropriately contoured to permit discharge of a fluid stream at or adjacent ground level when the other end of the nozzle is held by a person standing in a more or less upright position and provided further that the discharge end of the nozzle is shaped to develop a high velocity and comparatively flat, fluid stream.

I claim:

1. A nozzle for forming a broad flat high velocity liquid stream comprising a tubular member, means at one end of the tubular member for connection to a source of liquid, a restricted passageway in the opposite end of the tubular member giving access to the end opening of the tube, the passageway being defined by opposing flat portions of the tube wall disposed parallel to each other and substantially equidistant from and parallel to the longitudinal axis of the tube, the spacing between said flat portions of the tube wall defining the minor axis of said end opening, the said flat portions of the tube walls having the shape of circular segments on a chord which defines the major axis of said end opening and is of larger dimension than the diameter of the tube immediately preceding the passageway, the passageway defined by said flat wall portions being longer centrally of the tube than it is adjacent the outer extremities of the major axis of said opening.

2. A nozzle in accordance with claim 1 wherein the tube wall immediately adjacent said opposing flat portions of the tube wall and on opposite sides of a tube diameter slopes gradually and symmetrically inwardly into said opposing flat portions.

3. A nozzle in accordance with claim 1 wherein the minor axis of said opening as defined by the space between said opposing flat wall portions is from about 0.15 to about .035 inch.

CHARLES D. WILLIAMS.

References Cited in the file of this patent

UNITED STATES PATENTS

| Number | Name | Date |
|---|---|---|
| 242,871 | Bradish | June 14, 1881 |
| 1,877,388 | Coëlho | Sept. 13, 1932 |
| 1,949,904 | Guedel | Mar. 6, 1934 |
| 2,289,889 | Stick et al. | July 14, 1942 |

FOREIGN PATENTS

| Number | Country | Date |
|---|---|---|
| 13,626 | Great Britain | 1907 |